US006736754B2

United States Patent
Davids et al.

(10) Patent No.: US 6,736,754 B2
(45) Date of Patent: May 18, 2004

(54) METHOD FOR OPERATING A MOTOR VEHICLE HAVING AN AUTOMATIC TRANSMISSION WITH IMPROVED COMFORT

(75) Inventors: Bernd Davids, Weinstadt (DE); Ulrich Eckle, Donzdorf (DE); Roland Flinspach, Wiernsheim (DE); Günter Wörner, Kernen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/932,653

(22) Filed: Aug. 17, 2001

(65) Prior Publication Data

US 2002/0045980 A1 Apr. 18, 2002

(30) Foreign Application Priority Data

Aug. 17, 2000 (DE) .......................... 100 40 127

(51) Int. Cl.$^7$ ............................................ B60K 41/26
(52) U.S. Cl. .................. 477/92; 192/219; 192/219.1
(58) Field of Search .................. 192/219, 219.1, 192/220, 219.7, 221; 303/191, 89, 112; 477/92, 93

(56) References Cited

U.S. PATENT DOCUMENTS

| 2,821,275 | A | * | 1/1958 | Martin .................. 192/219.7 |
| 3,543,891 | A | * | 12/1970 | Mathers .................. 192/219 |
| 3,910,389 | A | * | 10/1975 | Pleier .................. 137/596.15 |
| 3,913,700 | A | * | 10/1975 | James .................. 180/271 |
| 4,790,606 | A | * | 12/1988 | Reinecke .................. 188/1.11 E |
| 5,052,531 | A | * | 10/1991 | Bota .................. 192/219.1 |
| 5,054,336 | A | * | 10/1991 | Takizawa .................. 192/220 |
| 5,208,754 | A | * | 5/1993 | Nakaura et al. .................. 180/197 |
| 5,496,098 | A | * | 3/1996 | Brearley .................. 303/22.2 |
| 5,775,785 | A | * | 7/1998 | Harris et al. .................. 303/156 |
| 5,819,897 | A | * | 10/1998 | Murata .................. 192/13 A |
| 5,875,680 | A | * | 3/1999 | Lorriette .................. 192/219 |
| 5,934,771 | A | * | 8/1999 | Ishikawa et al. .................. 188/181 C |
| 6,015,192 | A | * | 1/2000 | Fukumura .................. 303/140 |

FOREIGN PATENT DOCUMENTS

| DE | 34 04 154 | 11/1987 |
| DE | 40 09 791 | 10/1991 |
| DE | 197 33 472 | 8/1999 |
| DE | 198 07 357 | 8/1999 |
| DE | 199 49 449 | 5/2001 |

* cited by examiner

Primary Examiner—Rodney H. Bonck
Assistant Examiner—Eric M. Williams
(74) Attorney, Agent, or Firm—Kenyon & Kenyon

(57) ABSTRACT

In a method for operating a motor vehicle having an automatic transmission in the time of a selection action for a driving-mode range, first a driver's requirement for a change in the driving-mode range is transferred to a selection device, a change signal is then generated by the selection device, the change signal is subsequently transferred to a control unit, and, finally, a change in the driving-mode range of the automatic transmission is brought about by the control unit according to the change signal. In the time of the selection action for the driving-mode range, at least one braking device is actuated in an automated manner by the or a control unit. Drive-train oscillations may be reduced or avoided by the method.

17 Claims, 3 Drawing Sheets

METHOD FOR OPERATING A MOTOR VEHICLE HAVING AN AUTOMATIC TRANSMISSION WITH IMPROVED COMFORT

FIELD OF THE INVENTION

The present invention relates to a method for operating a motor vehicle having an automatic transmission during and/or in the time of a selection action for a driving-mode range.

BACKGROUND INFORMATION

To activate an automatic transmission, it is conventional, for example, as described in German Published Patent Application No. 198 07 357, to transfer a driver's requirement for a change in the driving-mode range, for example, into one of the driving-mode ranges P (parking mode), R (reverse travel), N (neutral position) or D (forward travel), to a control unit via a selection device designed as a selector lever or driving-mode selector lever. A suitable, in particular electrical or mechanical, change signal is generated in the selection device or the control unit. According to the change signal, a change in the driving-mode range of the automatic transmission is achieved, for example, by a change in the operating state of a clutch or brake of the automatic transmission or the release of a parking brake. This change in the driving-mode range leads to a change in the force flux and/or in the transmission ratio between the crankshaft of the drive assembly and the vehicle wheels. The change results in a change in the drive torque acting on the vehicle wheels, in the most unfavorable case, in a jump in the drive torque. The drive train, e.g., releasably, connecting the drive assembly to the vehicle wheels forms a continuum torsional oscillator or, in a simplified illustration, a torsional oscillator chain having multiple degrees of freedom.

Oscillations of the drive train occur because of the change in the drive torque. This results in accelerations of the motor vehicle fluctuating in time, so-called jolting oscillations, which are detrimental to, e.g., start-up, comfort. Further adverse effects may be impairments of driving safety, increased pitching movements or loss of track stability in the start-up range, increased slip, increased component wear and greater component dimensioning or, in the worst case, component failure. Other consequences of an undesirable oscillatory behavior are noise and vibration problems.

German Published Patent Application No. 34 04 154 describes a regulating device, in which, in order to damp oscillations, a controlling variable is determined from operating parameters in a correcting element. This controlling variable is supplied to a mixture-forming system of the internal combustion engine driving the motor vehicle. The mixture-forming system is operated, as a function of this controlling variable, so that the drive torque of the internal combustion engine is changed so that oscillations in the drive train are damped or suppressed. In a spark-ignition internal combustion engine, this is performed by the controlling variable influencing the throttle valve of the internal combustion engine.

German Published Patent Application No. 40 09 791 describes a method for damping oscillations of the type described above, in which a controlling variable determined in a correcting device and changing the drive torque of the internal combustion engine is supplied to the internal combustion engine as soon as oscillations occur. So that oscillations of this kind can be detected reliably and also damped quickly and effectively, rotational-speed gradients are determined from rotational-speed information and used for oscillation assessment. Moreover, by an in-phase change-over from the ignition times of a first ignition characteristic diagram stored in an ignition-time control apparatus to the corresponding ignition times of a second ignition characteristic diagram stored in the ignition-time control apparatus, the drive torque of the internal combustion engine is changed so that the oscillations in the drive train of the internal combustion engine are damped.

German Published Patent Application No. 197 33 472 describes a method for damping oscillations during the positive and negative acceleration of motor vehicles having manual-shift transmission and having an accelerator pedal acting on an engine and intended for stipulating the engine torque. In this method, when the accelerator pedal stipulates changes of the engine torque in jumps from an initial torque to a target torque, this engine torque is changed in two steps. In the first step, an intermediate engine torque is stipulated in a jump and, starting from an initial value of the vehicle acceleration, leads to a vehicle acceleration of which the first oscillation which is established has a peak value which corresponds to the new stationary value of the vehicle acceleration corresponding to the target torque. When this peak value is reached, in the second step, the target torque is stipulated in a jump. Oscillations can thereby be prevented effectively in all the operating states, without action being taken on the ignition and without the response behavior of the vehicle being appreciably impaired.

It is an object of the present invention to provide a method for the avoidance or reduction of drive-train oscillations caused as a result of a selection action for a driving-mode range.

SUMMARY

The above and other beneficial objects of the present invention are achieved by providing a method as described herein.

During or in the time of the selection action for the driving-mode range, at least one braking device is actuated in an automated manner by the or a control unit.

The braking device may include at least one braking device of any desired configuration that is arranged at any desired location on the drive train. For example, the braking device may include a wheel brake, a differential brake, a transmission brake or a generator driven by part of the drive train. Alternatively or additionally, the braking device may include a brake or clutch of the automatic transmission, by which brake or clutch it becomes possible for transmission-side part-regions of the drive train to be braced against one another or relative to the housing.

The effective duration of automated braking actuation may be, for example, in the range of milliseconds or seconds, for example 300 to 600 milliseconds, 600 to 1000 milliseconds or one or more seconds.

The present invention makes use of the fact that, with the automated introduction of friction in the braking device, additional damping in an amount capable of being influenced is introduced into the oscillatory system, with the result that oscillations of the drive train which occur due to the change in the drive torque may be damped effectively. Furthermore, in the case of a change in the braking torque applied in automated manner, a counteroscillation may be excited which is superposed in the drive train on the oscillation caused by the change in the drive torque. If there is a favorable configuration of the phase relationship, oscillation amplitude and oscillation frequency of the counteroscillation, the superposition of the forms of oscillation results in the resulting form of movement being reduced and, in the most favorable case, eliminated.

Due to the configuration according to the present invention, engine-side action measures, such as action on the ignition or action on the throttle valve, during the start-up process may be eliminated, reduced or supplemented. The braking action according to the present invention may occur more quickly than other conventional action measures if the control unit and the braking device are suitably configured.

In the simplest case, a movement of the motor vehicle is avoided despite, for example, abrupt or rapid, selection movement, for example, from N to D or R, by the automated generation of a fixed braking torque, the fixed braking torque subsequently being released in an automated manner, so that the drive torque is, e.g., gradually, issued to the vehicle wheels, with oscillations of the vehicle acceleration being eliminated.

Alternatively, the braking torque applied in an automated manner during or in the time of the selection action may be lower than the drive torque transmitted to the vehicle wheels by the drive assembly, so that a reduced residual drive torque remains for the acceleration of the motor vehicle. The result of this is that, for example, in the case of an initially sharp rise of the drive torque with a subsequent more gradual rise of the latter, if the braking torque is suitably selected the residual drive torque is transferred to the vehicle wheels for acceleration only when the braking torque is reached, in the most favorable case only within the range of the more gradual rise of the drive torque. In this case, the braking torque forms a threshold value below which torque jumps may not lead to the start-up comfort being impaired.

The braking torque generated by the braking device constitutes an effective damping of the forms of oscillation of the drive train or of the start-up acceleration because of the frictional forces which are always counter to the direction of movement of the drive train and are substantially independent of the speed of the drive train.

The method according to the present invention may be implemented in a simple manner, for example, with components which are present in any case. By the control unit, in particular, brake and/or traction systems, etc., present in any case, may be activated and signals from these utilized. The control unit, a transmission control device and control units from the brake or traction systems may be configured separately from one another and communicate with one another, in particular via a CAN bus, or be configured as a multi-functional unit.

According to a further aspect of the present invention, a braking torque generated according to a brake pedal or a parking brake, for example, in the parking position, during or in the time of the selection action is at least partially maintained in an automated manner in spite of the release of the brake pedal or the parking brake. This constitutes a particularly efficient example embodiment of the method according to the present invention, since, for example, a brake pressure present in any case in the brake cylinders may be utilized and therefore there is no need for a time-consuming and/or high-energy hydraulic pressure build-up in the brake cylinders.

A braking torque generated in an automated manner in the braking device may have a curved profile. This profile may be made smooth at the commencement of automated braking actuation and at the end of this or have a kink or a jump. The profile and the transitions at the commencement and the end are matched to the changes in the drive torque and to the dynamics of the torsional oscillator chain so that the oscillation which is established in the vehicle acceleration is minimal. In this case, any desired curve profiles, such as, for example, rectilinear, ramp-like, polynomial or harmonic profiles, may be considered.

In the method according to the present invention, the braking torque generated in an automated manner may be applied according to a form of movement of the drive train. For this purpose, for example, the form of movement of the drive train or the vehicle acceleration is detected by measurement. The drive torque causing the oscillation excitation may be detected. In the case of a known transmission behavior or known transmission function, the oscillation resulting without a braking action may be determined and the braking-torque profile necessary for a reduction in oscillation be ascertained a priori or during operation. For a change in the braking torque, the alternating component of a signal may be processed and an increased braking torque may be generated in the phases of an excessive acceleration of the motor vehicle. By contrast, in the phases of desired or medium acceleration the braking action may be reduced, so that the stipulation of the driving-mode range, for example, a desired start-up, may be followed on average undamped and without delay, along with a simultaneous damping of the acceleration fluctuations in time.

According to a further aspect of the present invention, the braking torque generated in an automated manner may be applied according to a characteristic diagram. This characteristic diagram takes into account, for example, summer and winter operating ranges of the automatic transmission, drive conditions, changed due to temperature, in the transmission or engine or between the road and vehicle wheels and also other operating parameters, such as rotational speeds, component age, fuel quality, vehicle mass, including or excluding load, and/or ambient parameters such as the road quality or road gradient. Output variables of the characteristic diagram may be, for example, braking-torque profiles, the size of a jump or kink, the duration of the braking torque, curve-profile parameters or oscillation durations and oscillation amplitudes for braking-torque profiles fluctuating in time. The method according to the present invention may thus refer to empirically determined experimental values or to physical dependencies determined. A procedure of this kind has proved to be particularly reliable in practice.

The features mentioned above and those yet to be explained below may be used not only in the combination specified in each case, but also in other combinations or alone, without departing from the scope of the present invention.

DETAILED DESCRIPTION

Figure 1:
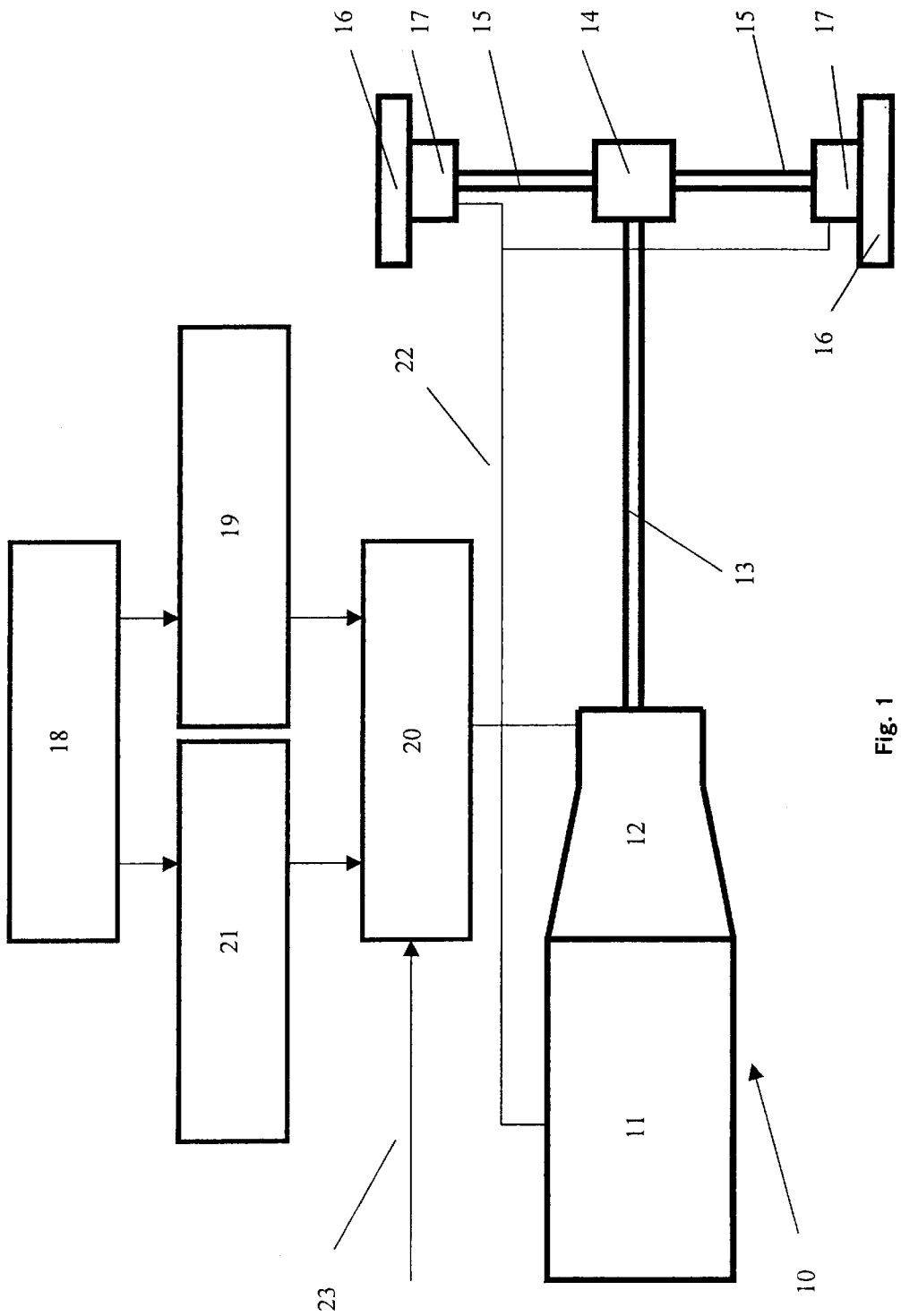
FIG. 1 is a schematic view of an example embodiment of a drive train.

FIG. 1 illustrates a drive train 10 of a motor vehicle. The drive train 10 includes a drive assembly 11, for example, an internal combustion engine, a transmission unit 12, a drive shaft 13, for example, configured with an intermediate cardan shaft, an axle gear 14, for example, with a differential, two axle shafts 15 branching off from this, and vehicle wheels 16 which are and/or may be brought into drive connection with one another in the specified order. Braking devices 17 for generating a braking torque, which are supported relative to the vehicle body, a vehicle carrier or an axle housing, act on the axle shaft 15 or the vehicle wheels 16.

The motor vehicle is operated by a driver 18 who, via actuating devices 19, such as accelerator pedals and/or further operating devices, may transfer, e.g., driving, operating requirements to a control unit 20 by these being converted to an electrical signal. Via a selection device 21, the driver 19 may preselect a driving-mode range, e.g., driving-mode ranges P, R, N, D, for example, with the additional option of a sequential manual stipulation of a gear stage in the state D. A signal generated in the selection device 21, with the state of the selector lever, in particular its position and/or movement, being taken into account, is likewise supplied to the control unit 20.

The control unit 20 communicates via lines 22 and/or a CAN bus with the drive assembly 11, the transmission unit 12 and the braking devices 17 and suitably activates the same. A feedback on operating states of the units communicating with the control unit 20 occurs via the lines 22 or the CAN bus. The control unit 20 receives further parameters and, e.g., measurement, signals 23, such as operating parameters or ambient parameters, in particular those on which the drive-torque profile depends, e.g., engine rotational speed, vehicle-wheel rotational speeds, operating states of the traction and brake systems or of the transmission and of the drive assembly, ambient temperatures, component temperatures, air pressure, measured driving-dynamics variables, brake-pedal or accelerator-pedal position, etc. The control unit may include memory elements which contain, for example, at least one measured previous oscillation behavior. Furthermore, an operating period of a component of the motor vehicle or of the motor vehicle itself may be stored in the memory unit.

Figure 2:
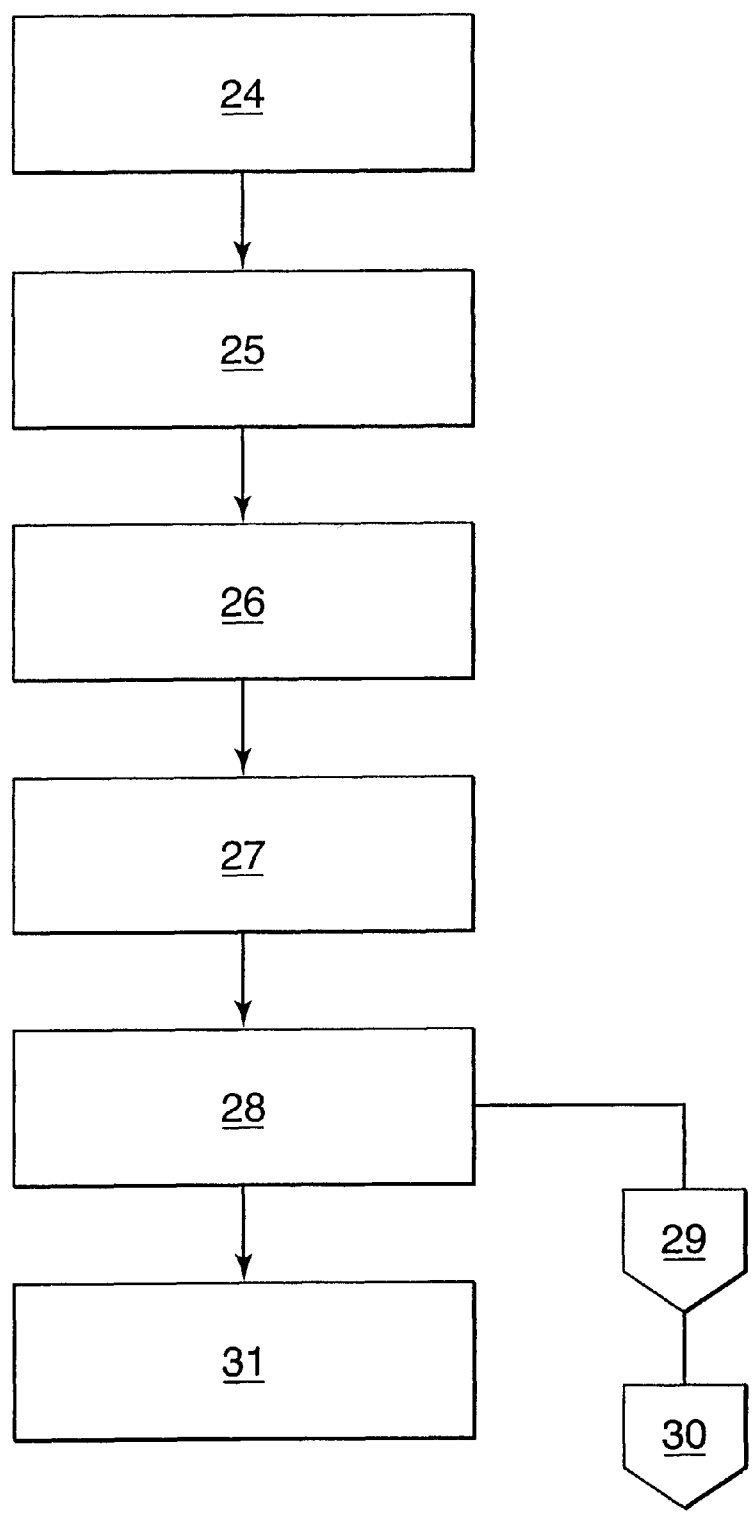
FIG. 2 is a block diagram of the method according to the present invention.

FIG. 2 illustrates an example embodiment of a method according to the present invention for a driver-induced change from a driving-mode range P to a driving-mode range D (or R). First, in a first step 24, the driver changes the selection device 21 from the state P into the state N. This is possible, for example, for implementing a shift lock, only when an actuating device 19 configured as a vehicle brake is actuated.

In a second step 25, the control unit 20 activates the transmission unit 12 in order to implement the stipulation from step 24 for the purpose of changing the driving-mode range. For example, a parking brake actuated in P is released.

Subsequently, in a third step 26, the driver cancels the signal causing the actuation of the vehicle brake. According to a first arrangement of this step 26, the control unit 20 activates the braking device according to the driver's requirement for canceling brake actuation. According to a second alternative arrangement, in step 26, a prevailing braking torque or a brake pressure giving rise to this is not canceled or is merely reduced.

In a next step 27, the driver changes the stipulation of the driving-mode range via the selection device 21 from N to D (or R).

Immediately thereafter, in step 28, the control unit 20 activates the braking device 19 in order to achieve an initial value 29 of a braking-torque profile 30 determined in the control unit 20 or prevailing. This may signify, in accordance with the first arrangement of step 26, an increase in the brake pressure or, in accordance with the second arrangement of step 26, a holding of the brake pressure or an increase or reduction in the latter.

In the next step 31, the control unit 20 activates the transmission unit 12 in order to implement the stipulation from step 27 for the purpose of changing the driving-mode range. For example, a drive connection is made between the drive assembly 11 and the vehicle wheels 16, in particular a clutch or brake of a transmission unit 12 configured as an automatic transmission is actuated or released. During and after step 31, the control unit 20 activates the braking device 17 in order to achieve the braking-torque time profile 30, so that the vehicle continues to be firmly braked or is set in motion with the longitudinal acceleration profile oscillating to a reduced extent.

Figure 3:
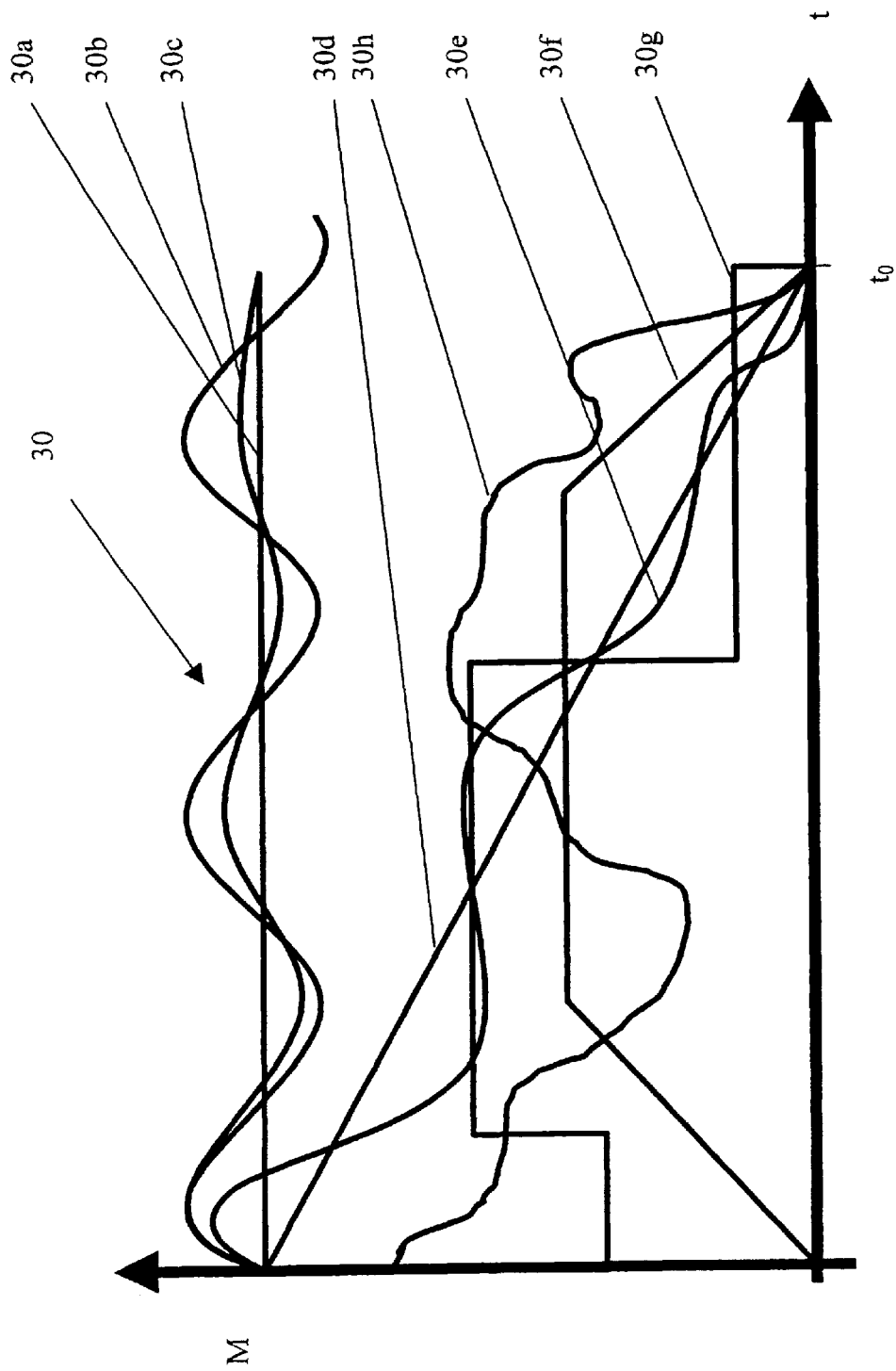
FIG. 3 is a graphical view of braking torque profiles according to the present invention.

Possible braking-torque profiles are illustrated in FIG. 3 as a function of time. The coordinate origin of the time axis corresponds, in this case, approximately to the commencement of the initiation of step 26 or 27 by the driver. The generation of the automatically applied braking torque ends at the time point t0.

The braking-torque profile 30 may have any desired form. FIG. 3 illustrates, merely by way of example, some possible braking-torque profiles 30 including: a constant profile (30*a*), a constant profile with superposed undamped (30*b*) or damped (30*c*) oscillation, a linearly falling profile (30*d*), a linearly falling profile with superposed oscillation (30*e*), a ramp-like profile with a linear rise, constant torque level and a linear fall (30*f*), a profile with a plurality of constant ranges separated by jumps (30*g*) or an irregular profile (30*h*). Mixed forms of the profiles illustrated may also be possible. All of the profile parameters, such as initial and final values, jump heights, durations, oscillation durations, oscillation amplitudes, oscillation damping or gradients, may be stipulated a priori, for example, stipulated as a fixed quantity or via a characteristic diagram dependent on operating and/or ambient parameters, be adapted by the quality of previous driving-range changes or be currently determined according to the result of a current or previous measurement of the form of movement of the drive train or motor vehicle. According to a further embodiment, the braking-torque profile may be the result of a control or regulation of the braking torque, an input variable for regulation being a measurement-determined movement behavior or oscillation behavior of the movement of the drive train or of the motor vehicle or a measurement variable at least correlating with the transferred drive torque.

The application of the brake force occurs according to any desired conventional arrangement, for example, by a hydraulically or electro-hydraulically actuated drum or disc brake. Alternatively to the illustrated transmission of drivers' requirements, such as the driving-mode range, via electrical signals, mechanical transmission of these requirements is also possible.

Furthermore, to determine the braking-torque profile 30, it is possible to use the methods described in German Published Patent Application No. 199 49 449.

An improvement in the method according to the present invention may be achieved, using a braking device which also generates negative braking torques, i.e., additional drive torques. For example, any desired electrical machine, for example, a direct-current or alternating-current, three-phase asynchronous or three-phase synchronous machine, with the generation of a braking action in the generator mode and the generation of a drive torque in the drive mode, may be used as a braking device.

Should a particularly sporty start-up behavior be required, automated braking action may occur so that the drive torque is first transferred, unreduced, to the vehicle wheels. After an idle time, braking action then occurs. The braking-torque profile 30, which in this case has an idle time, is configured so that the oscillation of the drive train is utilized for increasing the start-up dynamics and the damping action of the method according to the present invention is employed only when a desired acceleration value is reached or after a first overshoot of the acceleration profile.

The braking-torque profile 30 or the automated actuation of the braking device 17 may be dependent on the position or rate of change of the accelerator pedal. If, for example, it is detected that a high acceleration of the motor vehicle is required by the driver, automated braking actuation may be deactivated or the braking-torque profile may proceed at a lower braking-torque level.

The present invention may be employed in conjunction with shift-by-wire selection devices, automatic transmissions, CVT transmissions and front-wheel or rear-wheel drive vehicles. Furthermore, it is possible for the method according to the present invention to be employed in addition to conventional methods for the damping of oscillations.

What is claimed is:

1. A method for operating a motor vehicle having an automatic transmission one of during and in a time around a selection action for a driving-mode range, the method comprising the steps of:

transferring a driver's requirement for a change in the driving-mode range, from a neutral driving-mode range to one of a forward-direction driving-mode range and a reverse-direction driving-mode range, to a selection device;

generating a change signal by the selection device in accordance with the driver's requirement transferring step;

transferring the change signal generated in the generating step to a control unit;

actuating at least one braking device in an automated manner by the control unit after the driver's requirement for a change in the driving-mode range from the neutral driving-mode range to the one of the forward-direction driving-mode range and the reverse-direction driving-mode range is transferred to the selection device in the driver's requirement transferring step;

after the at least one braking device is actuated in the actuating step, changing the driving-mode range by the control unit in accordance with the change signal, from the neutral driving-mode range to the one of a forward-direction driving-mode range and a reverse-direction driving-mode range; and after the changing step, releasing the at least one braking device in an automated manner after an effective duration of the actuating of the at least one braking device.

2. The method according to claim 1, wherein the actuating step is performed one of during and in the time around a selection action of one of from and to a forward driving-mode range.

3. The method according to claim 1, wherein the actuating step is performed one of during and in the time around a selection action of one of to and from a reverse driving-mode range.

4. The method according to claim 1, further comprising the steps of:

generating a braking torque in accordance with an actuating device one of during and in the time around the selection action; and at least partially maintaining the braking torque in an automated manner after a release of the actuating device.

5. The method according to claim 4, wherein the actuating device includes at least one of a brake pedal and a parking brake.

6. The method according to claim 4, wherein the braking torque generated in the generating step has a curved braking-torque-over-time profile.

7. The method according to claim 6, wherein the braking torque generated in the generating step has a linearly falling braking-torque-over-time profile.

8. The method according to claim 4, further comprising the step of determining and applying the braking torque generated in the generating step as a function of oscillating movement of a drive train of the motor vehicle.

9. The method according to claim 8, wherein the braking torque generated in the generating step is applied in the determining and applying step based on a characteristic diagram.

10. The method according to claim 8, wherein the braking torque generated in the generating step is applied in the determining and applying step as a function of a mass of the motor vehicle.

11. The method according to claim 1, wherein the at least one braking device includes at least one of a differential brake, a transmission brake and a generator.

12. The method according to claim 1, wherein the at least one braking device includes at least one of a brake of the automatic transmission and a clutch of the automatic transmission.

13. The method according to claim 1, wherein the effective duration is one of in a range of 300 to 600 milliseconds, in a range of 600 to 1000 milliseconds and more than one second.

14. The method according to claim 1, wherein the actuating step includes increasing a brake pressure in the at least one braking device in an automated manner by the control unit.

15. The method according to claim 1, wherein the actuating step includes generating a drive torque in a direction opposite to a direction of the one of the forward-direction driving-mode range and the reverse-direction driving-mode range.

16. The method according to claim 1, wherein the at least one braking device is actuated in the actuating step in accordance with at least one of a position of an accelerator pedal and a rate of change of the position of the accelerator pedal.

17. The method according to claim 1, wherein the automatic transmission includes a continuously-variable transmission.

* * * * *